United States Patent Office 3,301,593
Patented Jan. 31, 1967

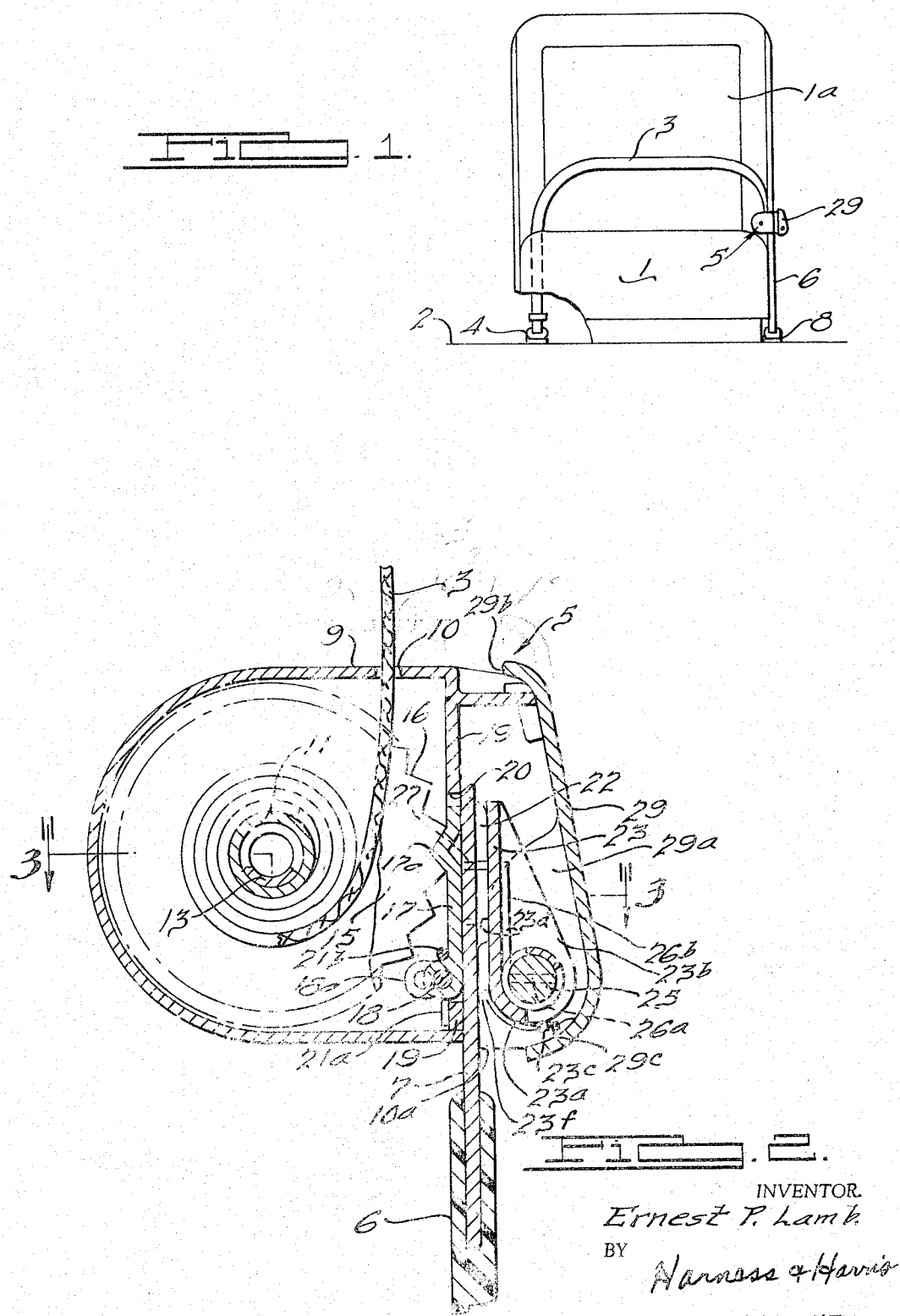

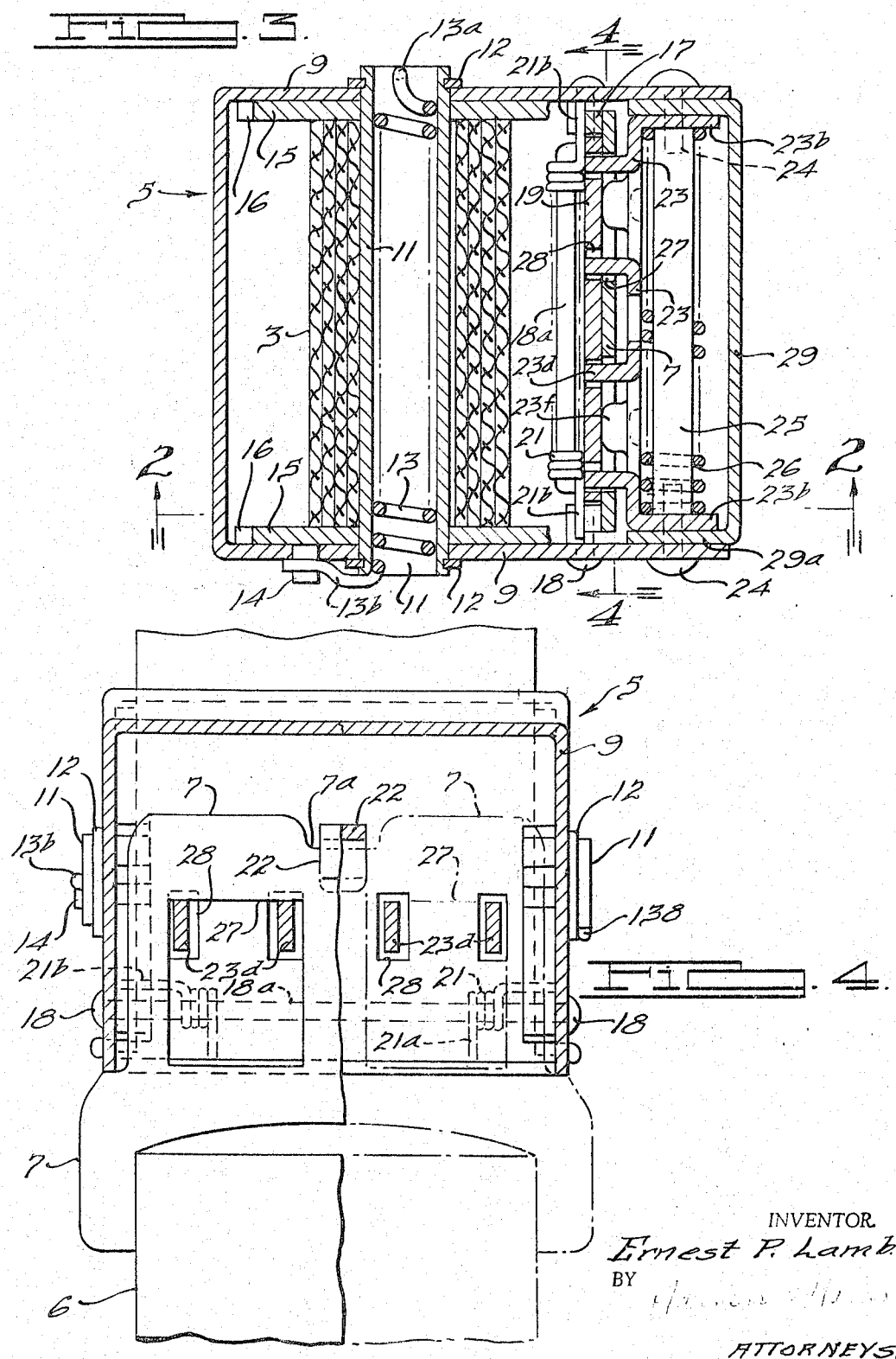

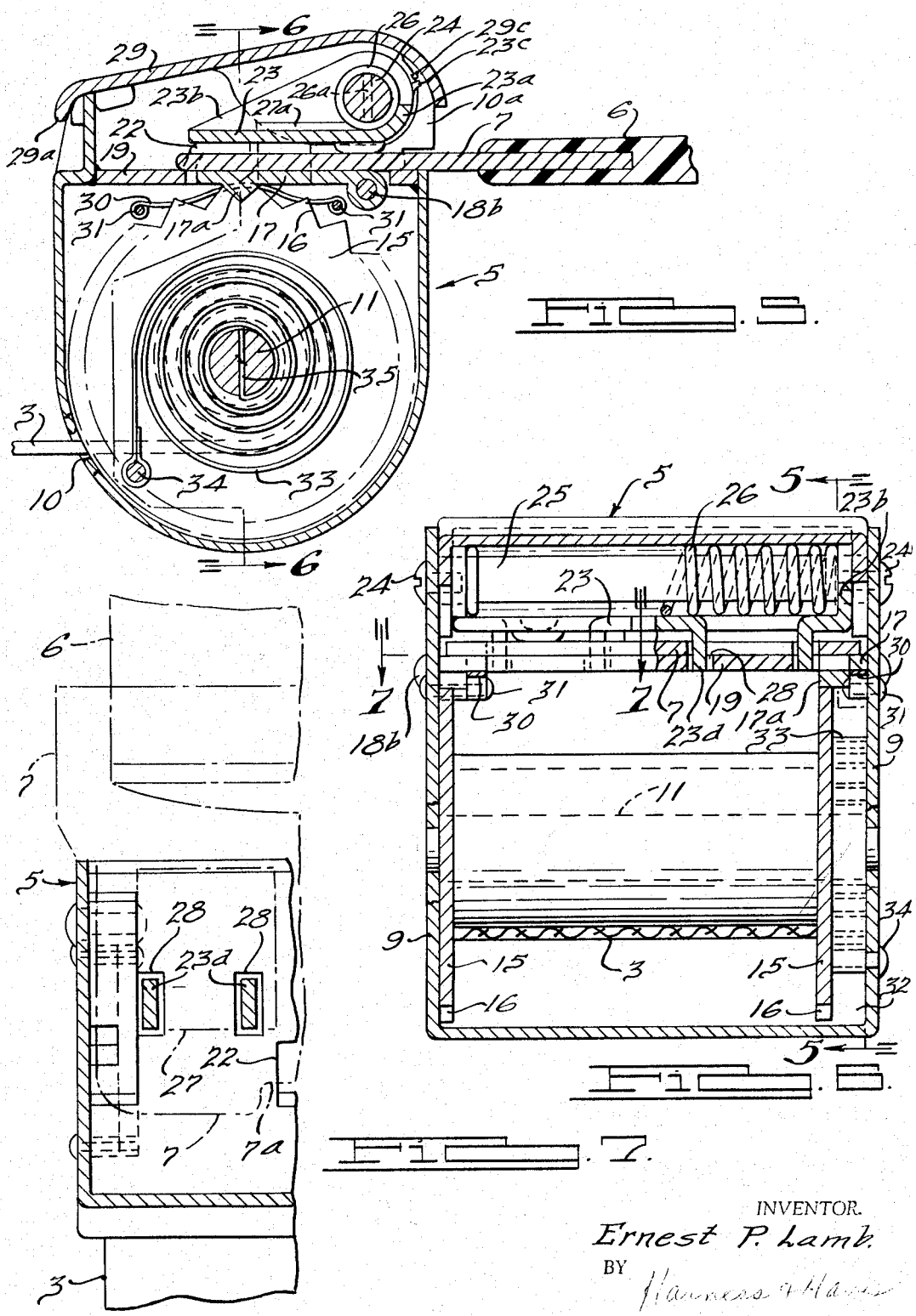

3,301,593
SEAT BELT
Ernest P. Lamb, Grosse Pointe Park, Mich., assignor to Chrysler Corporation, Highland Park, Mich., a corporation of Delaware
Filed Sept. 18, 1964, Ser. No. 397,574
3 Claims. (Cl. 297—388)

This invention relates to safety belts and in particular to an automobile seat belt, although the invention can be readily used in other situations where a safety belt is desired, as for example, with aircraft, boats, ski lifts, and the like.

A frequent objection to the use of automobile seat belts, particularly by the driver, is that the ends of the belt are not confined to a predetermined location when the belt is not in use and are accordingly not readily accessible. Often one or both of the belt ends are lost behind or at the sides of the seat, such that an individual in the automobile will ignore the seat belt rather than fish for it while the automobile is in motion. Even when the ends of the seat belt are accessible, the driver will frequently not use the belt if it will restrain his body movements during a maneuver from a parking space, for example. Thereafter, while on the road, he finds it difficult to adjust and fasten the seat belt without taking his hands from the steering wheel, and thus often fails to use the safety belt at all.

Important objects of the present invention are to provide an improved safety belt and arrangement in the fastening device therefor which avoid the above problems and assure that the ends of the belt when not in use are always in a predetermined location at the sides of the seat and available for use.

Another object is to provide such a seat belt which is self-adjusting in length so as to fit any user without inconvenience, which can be readily employed and secured by the user with one hand, and which when secured will effect a predetermined safe and comfortable tension across the user's body.

Another and more specific object is to provide an arrangement in a seat belt type safety device comprising a belt secured at a fixed end adjacent one side of the seat occupied by the user and having a free end secured to a belt dispenser which also carries a suitable length of the belt and yieldingly dispenses the same when the dispenser is pulled across the body of the user in the direction from the fixed end, or retracts the belt to the dispenser and pulls the latter in the opposite direction to a rest position when the dispenser is released. The dispenser is adapted to be readily gripped by one hand of the user and pulled across his body and is cooperable with the fixed retainer at the opposite side of the seat for automatically interlocking therewith. Preferably the belt is yieldingly dispensed against the tension of resilient means, which may be provided in the belt, as for example in a belt of laminated structure having a resilient layer under tension urging retraction of the belt, or which may comprise other spring means effective to urge retraction of the belt to the dispenser and thus yieldingly urge the dispenser in the direction toward the fixed end of the belt. Means are also provided by the safety device to prevent further feeding or dispensing of the belt when force is applied thereto in the direction toward its fixed end after the retainer and dispenser are interlocked with each other.

Also in a preferred automobile application, the seat belt extends upwardly from the support at the rear of the seat and between the latter and the seat back, thence to the dispenser. Thus when the belt is retracted to the maximum extent, the dispenser will be retained in a predetermined position by the seat and seat back adjacent their juncture at one side of the seat. When the dispenser is pulled manually across the body of the occupant of the seat, the belt will be maintained at a predetermined tension by the resilient means urging retracting of the belt. In consequence, the belt will be secured without slack to assure optimum efficiency and safety in restraining the occupant of the seat.

Another object is to provide such a safety device wherein the dispenser includes a reel adapted to wind the free end of the belt thereon or to feed or dispense the belt toward the latter's fixed end, the resilient means comprises a clock-type spiral spring carried by the dispenser and operable on the reel to yieldingly urge winding thereof, and the retainer includes a portion cooperable with the dispenser to lock the same against dispensing of the belt when the dispenser and retainer are interlocked with each other.

Other objects of this invention will appear in the following description and appended claims, reference being had to the accompanying drawings forming a part of this specification wherein like reference characters designate corresponding parts in the several views.

FIGURE 1 is a fragmentary front elevational view of an automobile seat and safety belt embodying the present invention;

FIGURE 2 is a fragmentary sectional view through the belt dispensing mechanism of FIGURE 1, taken in the direction of the arrows substantially along the broken line 2—2 of FIGURE 3;

FIGURE 3 is a sectional view taken in the direction of the arrows substantially along the broken line 3—3 of FIGURE 2;

FIGURE 4 is a sectional view taken in the direction of the arrows substantially along the line 4—4 of FIGURE 3;

FIGURE 5 is a view similar to FIGURE 2, showing a modification of the invention;

FIGURE 6 is a sectional view taken in the direction of the arrows substantially along the broken line 6—6 of FIGURE 5; and FIGURE 7 is a fragmentary sectional view taken in the direction of the arrows substantially along the line 7—7 of FIGURE 6.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a specific embodiment of the present invention is illustrated by way of example comprising an automobile seat 1, which may be either a front or rear seat, single or double seat, but in the present instance is the driver's bucket seat mounted on a fixed support 2 comprising the body floor or chassis. A flexible safety belt 3 having a fixed end 4 secured to the support 2 and a free end contained within a dispenser or buckle 5 is adapted to extend snugly across the body of the occupant of the seat 1 as a restraint. The dispenser 5 is releasably secured to a steel blade 7 of a fixed retainer 6 which in turn is secured at its lower end 8 to the support 2. In the above regard, the belt end 4 and retainer end 8 may be secured to any suitable part of the automobile, as for example the frame of seat 1, the body understructure or side structure. The retainer 6 may also be secured to the vehicle door panel, in which case the door will tend to be held closed during an accident. Also the concept of the safety assembly shown may be used in other personnel retention assemblies, as for example in the shoulder type harness.

The retainer 6 is preferably of rigid material adapted to remain in a fixed position with respect to the seat 1. Where desired, the retainer 6 may be pivotally secured at 8 to the support 2, in which case the pivotal connection 8 will be provided with sufficient friction to hold the retainer 6 in any position of angular adjustment while enabling the retainer 6 to be swung out of the way of a passenger moving into or out of the automobile.

The belt dispenser 5 comprises a plastic or sheet metal housing 9 and means for selectively dispensing or retracting the belt 3 and also means for interlocking with the blade 7. The belt 3 extends upwardly from its attachment 4 at the rear of the seat 1 adjacent the latter's right edge and forwardly of the seat back 1a, thence through an opening 10 in the housing 9 to the hollow spool 11 of a reel to which the other end of the belt is secured and on which the belt is spirally wound. The opposite ends of the spool 11 are journaled in the housing 9 and are retained against displacement by C-shaped retainers 12 partially embedded in the outer circumference of the spool 11 adjacent and exteriorly of the housing 9. A coil spring 13 extends coaxially within the spool 11, one end 13a of the spring extending through and being secured within a slot in an end of the spool 11, the other end 13b extending endwise and radially of the spool 11 and being anchored by means of a stud 14 secured to the housing 9. The spring 13 is biased under tension tending to wind the spool 11 about its axis clockwise in FIGURE 2 so as to reel in or retract the belt 3 into the housing 9, or to pull the latter leftward in FIGURE 1 toward the fixed end of the belt 4. Although a right handed belt dispensing assembly is shown, the attachments 4 and 8 could be reversed so that the dispenser 5 would travel from left to right across the occupant of the seat 1 from the fixed end 4.

In order to prevent unwinding of the spool 11 and loosening of the belt 3 when the latter is applied as in FIGURE 1, the reel on which the belt 3 is wound also includes a pair of ratchet wheels 15 adjacent opposite sides of the belt 3 within the housing 9 and secured coaxially to the spool 11 for rotation as a unit therewith. The periphery of each ratchet wheel 15 is serrated at 16 to engage the detent or pawl 17a of a swinging lever 17 pivotally mounted within the housing 9 on each of the opposite ends of a shaft 18 secured at said ends to the housing 9.

Generally coplanar with the detent levers 17 is a platform 19 comprising a portion of the housing 9 and having holes 20 therein adjacent its opposite edges for the detent levers 17. As illustrated in FIGURES 2 and 3, the central portion of the shaft 18 is offset at 18a from the platform 19 and carries a pair of coil springs 21. Each spring 21 is provided with an end 21a, extending transversely to the axis of shaft portion 18a and abutting the platform 19, and also with an end 21b parallel to the axis of shaft 18a and abutting the adjacent detent arm 17. The springs 21 are resiliently biased to urge their associated detent levers 17 clockwise in FIGURE 2 so as to move the detents 17a out of engagement with teeth 16 of the ratchet wheels 15 and thereby to release the reel 11, 15 for reeling or unreeling the belt 3.

Referring to FIGURES 2 and 4, a stop 22 is lanced from the platform 19 to provide a parallel projection 22 offset oppositely from the reel 11, 15. A pivotal locking member 23 providing a swinging end adapted to rest against the stop 22 has lateral sides 23b pivotally secured to the opposite sides of the housing 9 by means of large headed studs 24 extending into opposite ends of a spacer shaft 25. A spiral spring 26 extending coaxially around the spacer 25 has one end 26a extending diametrically through the spacer 25 and secured thereto. The opposite spring end 26b engages the locking member 23 under resilient tension urging the latter counterclockwise in FIGURE 2 to a locking position. A plurality of dogs 23d integral with member 23 extend through holes 27 in the blade 7 and holes 28 in the platform 19 when the dispenser 5 and retainer 6 are interlocked as illustrated. As shown in FIGURE 4, the edges of the blade 7 defining the holes 27 engage the dogs 23d to prevent separation of the blade 7 from the dispenser 5.

In order to release the blade 7 from the dispenser 5, a pivotal release handle 29 is provided with side flanges 29a located between the side flanges 23b and housing 9 and pivotally mounted on the studs 24. The handle 29 terminates in a finger engaging tip 29b spaced outwardly from the housing 9 and readily accessible to the occupant of the seat to be pivoted clockwise in FIGURE 2. A lug 29c of the handle's side flanges 29a engages a lug 23c of the locking member 23, so that upon clockwise pivoting of the handle 29, the locking member 23 will also be swung clockwise to move the dogs 23d out of engagement with the blade 7 and enable separation of the dispenser 5 from the blade 7.

The blade 7 when assembled with the dispenser 5 lies closely adjacent to the platform 19 and coplanar detent levers 17. Thus upon withdrawal of the blade 7 from the dispenser 5, the springs 21 will swing the levers 17 clockwise from the ratchet wheels 15 and retract the detents 17a from the teeth 16. If the dispenser 5 is then allowed to move freely, the spring 13 will wind the belt 3 onto the spool 11 and pull the dispenser 5 leftward in FIGURE 1 to the limit of possible movement at the right edge of the seat 1 at the latter's juncture with the seat back 1a. Upon manual release of the handle 29, the spring 26 urging locking member 23 counterclockwise in FIGURE 2, will cause lug 23c to engage lug 29c and swing handle 29 counterclockwise to the position shown.

By virtue of the construction described, when the safety belt is not in use, the dispenser 5 will be yieldingly maintained in a predetermined position adjacent the right edge of the seat 1 at its juncture with the back 1a. When it is desired to apply the safety belt, the occupant of the seat will take the dispenser 5 in one hand and pull the dispenser across his body, causing the belt 3 to unreel against the tension of spring 13. The dispenser 5 is then fitted by one hand over the upstanding end of the blade 7, such that the latter enters the opening 10a at the leading portion of the housing 9. In this regard, the leading edge of the pivotal locking member 23 is curved at 23a generally coaxially around the pivot studs 24, so as to provide a cam surface directing the blade 7 toward the platform 19. By securing the dispenser 5 to the blade 7 at one side of the seat occupant, there is less likelihood of causing injury to the occupant in the event that he is forced forwardly during an accident.

Embossed from the locking member 23 are a pair of cam projections 23f which provide cam surfaces cooperable with edge 23a to guide the upper edge of the blade 7 to the platform 19. As the dispenser 5 is forced downwardly against the upstanding blade 7, the latter will engage the dogs 23d and swing the locking member 23 clockwise in FIGURE 2 until the leading portion of the blade 7 at the recess 7a is secured between the stop 22 and the platform 19. At this position, the dogs 23d will align with the openings 27 in the blade 7 and return to the detent position illustrated in FIGURES 2 and 3. Also as the blade 7 slides into interlocking position with the dispenser 5 as illustrated in FIGURE 2, the blade 7 will engage the detent members 17 and swing the latter counterclockwise against the force of springs 21 to the detent position illustrated, thereby to lock the reel 11, 15 and belt 3 against further dispensing movement.

FIGURES 5–7 illustrate a modification of the present invention wherein the general arrangement of the belt 3 with respect to the seat 1, support 2, dispenser 5 and retainer 6 are the same as described above. The structures of the blade 7, detent member 17, locking member 23, and release lever 29 are substantially identical with the corresponding structures described above and are accordingly numbered the same. Instead of the offset pivot shaft portion 18a carrying the springs 21, these springs have been eliminated and the detent levers 17 are pivotally secured directly to the sidewalls of the housing 9 by means of rivets 18b. The springs 21 are replaced by leaf springs 30 pivotally secured at opposite ends to the side walls of the housing 9 by rivets 31. These springs 30 extend lengthwise of the swinging levers 17 and engage the same at locations offset from the detent projections 17a so as to urge the levers 17 clockwise in FIGURE 5 from the detent position.

Instead of the small diameter spring 13 contained coaxially within the spool 11, a clock-type spiral spring 33 is wound around the axis of the spool 11 within a space 32 provided therefor between one of the ratchet wheels 15 and the side wall of housing 9. One end of the spring 33 is anchored to the housing 9 by a rivet 34. The other end of the spring 33 is secured diametrically at 35 to the spool 11 and is under tension tending to rotate the latter counterclockwise in FIGURE 5 so as to wind or reel in the belt 3 as described above. Where desired, a space 32 and coil spring 33 will be provided also at the other side of the dispenser 5. By virtue of using the large diameter spiral spring 33, a more uniform reeling tension on the belt 11 can be obtained throughout the entire range of movement of the dispenser 5. The belt will thus be under substantially the same tension when used with either a slight or a large person.

I claim:

1. In a safety device, a support, a safety belt having a fixed end secured to said support, a buckle having dispensing means for carrying said belt and for dispensing the same in the direction toward said fixed end, said dispensing means including a rotatable reel having said belt wound spirally thereon, resilient means yieldingly urging rotation of said reel to wind said belt thereon to retract the latter oppositely from said direction, a retainer secured to said support and having a rigid blade, interlockable means on said blade and buckle for interlocking upon movement of said buckle to a predetermined position with respect to said blade, means shiftable to a detent position for locking said reel against rotation to prevent said dispensing of said belt comprising detent means carried by said buckle and engageable by said blade to be shifted thereby to said detent position upon movement of said buckle to said predetermined position, and means for holding said detent means out of said detent position when said buckle is moved from said predetermined position.

2. In a safety device, a support, a safety belt having a fixed end secured to said support, a buckle having dispensing means for carrying said belt and for dispensing or retracting the same upon relative movement of said buckle with respect to said fixed end, a retainer secured to said support and having a rigid blade, interlockable means on said blade and buckle for interlocking upon movement of said buckle to a predetermined position with respect to said blade, means shiftable to a detent position for engaging said dispensing means to prevent said dispensing of said belt comprising detent means carried by said buckle and engageable by said blade to be shifted thereby to said detent position upon movement of said buckle to said predetermined position, and means for holding said detent means out of said detent position when said buckle is moved from said predetermined position.

3. In a safety device, a support, a safety belt having a fixed end secured to said support, dispensing means for carrying said belt and for dispensing the same in the direction toward said fixed end, said dispensing means including a rotatable reel having said belt wound spirally thereon, said dispensing means also including resilient means yieldingly urging rotation of said reel to wind said belt thereon to retract the latter oppositely from said direction, said reel having a ratchet wheel rotatable therewith, a retainer secured to said support, interlockable means on said retainer and dispensing means for interlocking upon movement of said dispensing means to a predetermined position with respect to said retainer, a pawl carried by said dispensing means and engageable with said retainer upon movement of said dispensing means to said predetermined position to be moved by said retainer into detent engagement with said ratchet wheel to lock said reel against rotation to prevent said dispensing of said belt, and means for holding said pawl out of said detent engagement when said dispensing means is moved from said predetermined position, and detent means cooperable with said retainer and dispensing means when the latter is at said predetermined position to lock said belt against said dispensing.

References Cited by the Examiner

UNITED STATES PATENTS

| | | | |
|---|---|---|---|
| 2,822,595 | 2/1958 | Ruhl | 24—170 |
| 2,964,815 | 12/1960 | Sereno | 24—75 |
| 3,174,704 | 3/1965 | Replogle | 242—107.4 |
| 3,227,489 | 1/1966 | Stubblefield | 297—388 |
| 3,231,307 | 1/1966 | Smith | 297—388 |
| 3,233,296 | 2/1966 | Whittingham | 24—78 |

FRANK B. SHERRY, *Primary Examiner.*

CASMIR A. NUNBERG, *Examiner.*